Oct. 26, 1937.  A. W. HAMMOND  2,096,716
ATTACHMENT FOR AUTOMATICALLY ADJUSTING BRAKES
Filed Sept. 1, 1936

INVENTOR
ARCHIE W. HAMMOND
BY
ATTORNEY.

Patented Oct. 26, 1937

2,096,716

UNITED STATES PATENT OFFICE 2,096,716

ATTACHMENT FOR AUTOMATICALLY ADJUSTING BRAKES

Archie W. Hammond, Los Angeles, Calif.

Application September 1, 1936, Serial No. 98,913

17 Claims. (Cl. 188—79.5)

My invention relates to braking devices for retarding and stopping the movement of devices, and relates in particular to an automatic adjusting means for brakes of the general character employed on automotive vehicles.

Brake structures of this character have shoes which are applied to a circular brake member which is generally in the form of a drum. As wear occurs on the frictionally engaging parts, principally the brake shoes, adjustment becomes necessary to keep the parts in or close to a prescribed relation. For example, one form of such brake employs a cam for expanding the brake shoes against the brake drum. This cam is connected to a brake lever or pedal through a series of connecting parts including levers. If greatest braking effect is to be produced from a given pressure against the foot pedal, these levers must move within definite limiting positions. Likewise, as the brake shoes wear, it becomes necessary to push the brake pedal farther down toward the floor board of the automotive vehicle until a condition is ultimately reached wherein the brake pedal is stopped by the floor board and sufficient force cannot be exerted to properly operate the brakes. Immediately after the adjustment of a set of brakes, wear proceeds to change them out of adjustment. The degree of misadjustment continues to become greater and greater until readjustment is absolutely necessary. From the foregoing it is apparent that during a very material part of the time brakes are employed, they are to some degree out of adjustment. It is an object of my invention to provide an automatic means associated with a brake structure, which will readjust the brake shoes to a prescribed condition of operation before a very great amount of wear has taken place, with the result that the brakes are kept as nearly perfectly adjusted as practically possible.

It is a further object of the invention to provide a device or attachment which may be applied to existing brake structures and which will operate to automatically adjust the same.

It is a further object of the invention to provide a brake adjusting device of this character having adjusting means connected to the brake shoes so as to be controlled by the movement thereof, thereby making it possible to use the adjusting means with brakes having different types of shoe expanding means. For example, some brakes have rotary cams for this purpose, whereas others have wedge type expanders. Since my automatic brake adjusting means is connected directly to the brake shoes, it may be used with any brake having shoes which are moved toward and away from a brake drum.

It is a further object of the invention to provide an automatic brake adjusting means having a take-up member adapted to be adjusted to compensate for wear, and actuating means for the take-up having connection with a brake shoe, whereby the movement of the brake shoe is magnified and transmitted to the take-up.

It is a further object of the invention to provide a simple attachment for the automatic adjustment of brakes, having lever members for transmitting movement from the brake shoes to a take-up or adjusting member, and also having a novel form of linkage connection with the brake shoes whereby the movement of the brake shoes is magnified in order that a small brake shoe movement will produce a relatively large movement of parts which are directly connected with the take-up or adjusting means.

Further objects and advantages of the invention will be brought out in the following part of the specification. Although the invention may be used with brakes of different types and details, I prefer to show the same in conjunction with a simple existing brake structure such as shown in the accompanying drawing, wherein.

Figure 1:
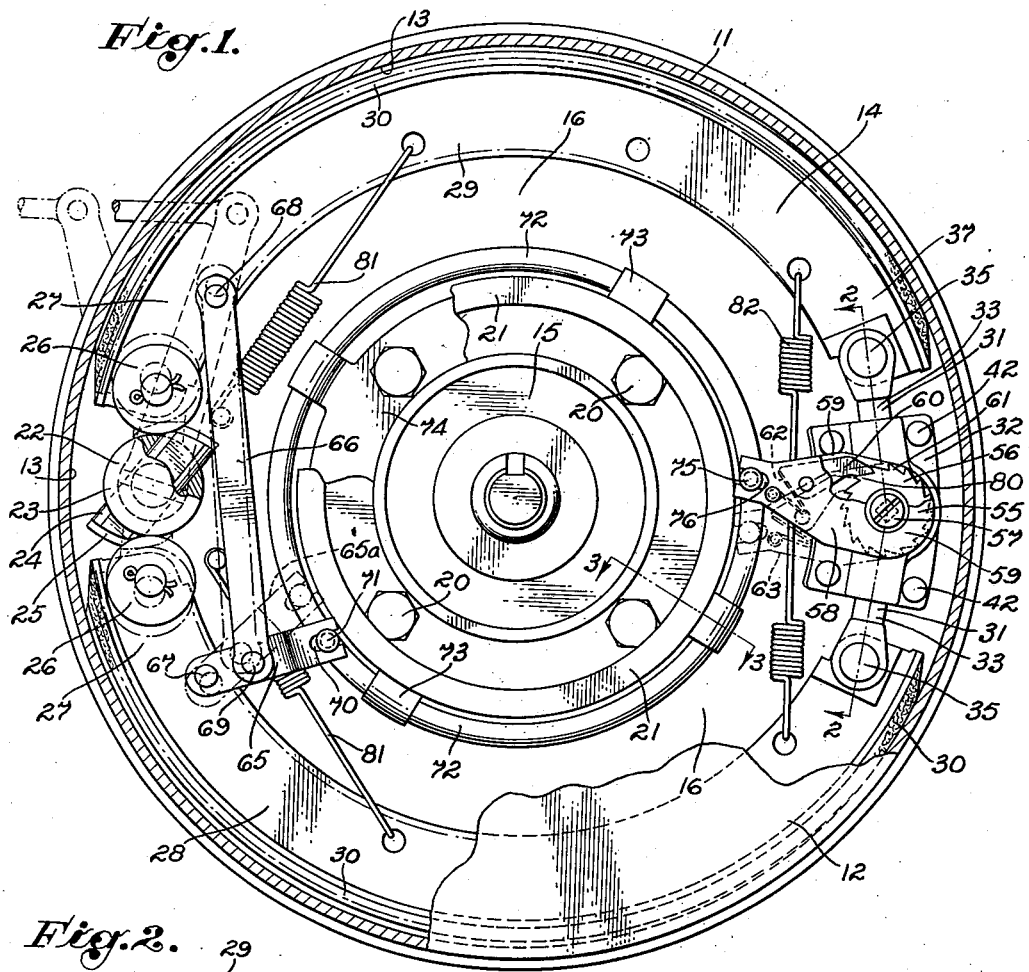
Fig. 1 is a face view of a brake structure with a portion of the brake drum removed so as to disclose the internal construction of the brake structure.

For the disclosure of a preferred and simple form of my invention, I have in Fig. 1 shown a brake drum 11 comprising a cylindrical wall which is connected to a plate 12 adapted to be secured to a wheel, not shown. In ordinary practice, the drum 11 constitutes the rotating frictional part of the brake structure, and the frictional surface 13 is circular in its general character.

The stationary part 14 of the brake structure is ordinarily mounted around the inner end of a spindle 15 having the function of supporting the automobile wheel, and in such position that it will be disposed within the brake drum 11. The stationary brake structure is shown as including a plate 16 having an inner flange portion 17 defining a central opening 18 through the plate, this flange portion 17 being adapted to be folded against a radial flange 19 associated with the spindle 15, by means of machine screws 20. There is also a ring member 21 secured against one face of the flange portion 17 by the screws 20. At one side of the plate 16, for example, the left side thereof, I show a brake applying means 22 which is essentially a rotary cam and includes a rotatable member 23 having a transverse cam element 24 with cam faces 25 at the ends thereof adapted to engage rollers 26 supported at the moving ends 27 of brake shoes 28 and 29 which are of arcuate form and have replaceable brake blocks 30 mounted thereon which make frictional engagement with the surface 13 of the drum 11 when the shoes 28 and 29 are expanded, or, in other words, are moved relatively apart so as to engage the drum 11.

Figure 2:
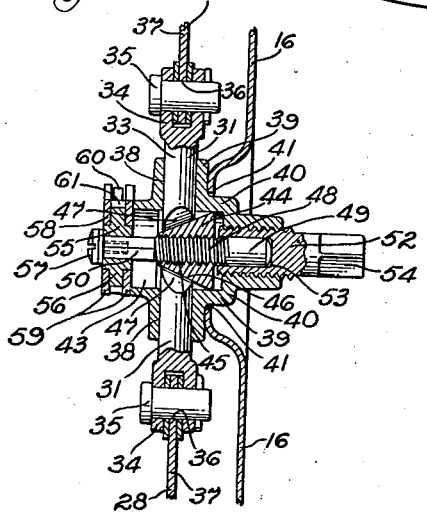
Fig. 2 is a fragmentary sectional view taken as indicated by the line 2—2 of Fig. 1.

The brake shoes 28 and 29 include, or have secured thereto, parts 31 which form part of or cooperate with an adjusting means 32. Each of the members 31 is shown as comprising a bar 33 with a clevis 34 at its outer end adapted to be connected to a brake shoe 28 or 29 by means of a pin 35 which passes through an opening 36 in a wall portion 37 of a brake shoe 28 or 29. The bar portions 33 project through opposed openings 38 in a fitting 39 which forms a part of the take-up means 32 and which is secured to the rightward portion of the plate 16, or on the side of the stationary brake structure 14 opposite from the applying means 22. The body or fitting 39 has a portion 40 which, as shown in Fig. 2, projects through an opening 41 in the plate 16, and the fitting 39 may be secured to the plate 16 by suitable means such as rivets 42. The member 39 has an opening 43, the axis of which is transverse to the axes of the bars 33, and in the opening 43 there is a cam 44 adapted to move the parts 31 relatively apart as outward adjustment of the rightward ends of the brake shoes 28 and 29 is required to compensate for wear. This cam 44 comprises a cylinder having an axial threaded opening 45 and having cam faces 46 which slope in relation to the axis of the cam 44. The cam faces 46 may be conveniently made of V-shape, as shown, and such cam faces 46 may be readily formed by the cutting of diagonal slots in the face of the member 44 by use of an angle milling cutter. The inner ends 47 of the bar portions 33 are cut, as shown in Fig. 2, to fit the cam faces 46, making such engagement therewith that the ends 47 of the members 33 will prevent rotation of the cam 44. This cam member 44, being mounted so as to move transversely with relation to the bar portions 33, will, when moved leftwardly from the position in which it is shown in Fig. 2, force the members 31 relatively apart. Such transverse movement of the cam 44 is accomplished by means of a screw 48 having threaded engagement with the threaded opening 45 of the cam member 44, having a base 49 and a squared stem 50 projecting in opposite direction from the base 49 and preferably out through the mouth of the chamber 43. Means are provided for determining the position of the screw, such means being shown in the form of a second screw member 52 which is threaded into the portion 40 of the fitting 39 and has an opening or pocket 53 receiving the base 49 of the screw 48. The end 54 of the screw member 52, which is exposed to the exterior or back of the brake structure so as to be accessible for adjustment without dismantling the brake assembly, is squared or otherwise suitably prepared to receive a wrench by which to adjust the same.

On the stem 50 of the screw 48 there is a ratchet device 55 comprising a toothed wheel 56 which is fixed on the outer end of the stem 50 by means such as a screw 57, and a lever member 58 having a pair of parallel plate portions 59 which rest against opposite sides of the ratchet wheel 56 and turn thereon through a limited arc of movement as will be hereinafter described. In Fig. 1, one of the plate portions 59 is shown broken away to show a pawl member 60 carried by the lever member 58 in a position to engage, one at a time, the teeth 61 of the ratchet wheel 56, there being a spring 62 resiliently urging the pawl 60 into engagement with the ratchet wheel 56.

The lever member 58 is adapted to be swung back and forth from a position such as that in which the lever member 58 is shown in full lines in Fig. 1 to a position such as indicated by dotted lines 63. Whenever the angle through which the lever member 58 is swung around the axis of the screw 48 exceeds the angle defined by two adjacent teeth 61 of the ratchet member 56, the pawl 60 will engage a succeeding tooth of the ratchet wheel and will accordingly advance the ratchet wheel one tooth, turning the screw 48 and consequently advancing the cam member 44 a short distance forwardly to spread the parts 31 and produce a pawl take-up adjustment of the brake shoes 28 and 29. Means are provided for swinging the lever member 58 in accordance with the movement of the brake pedal, not shown, and likewise in accordance with the movement of other actuating parts of the brake structure. Whenever the movement of these actuating parts exceeds a predetermined value due to the fact that wear has occurred between the brake blocks 30 of the brake shoes 28 and 29 and the drum 11, the angle of swinging movement of the lever member 58 will be such as to cause the pawl 60 to engage the succeeding tooth 61 of the ratchet wheel 56, advancing the adjustment cam member 44 to take up and compensate for wear, with the result that the movement in the actuating parts of the brake structure in bringing the brake shoes 28 and 29 into full engagement with the drum 11 will be reduced or returned to the proper value.

This movement of the lever member 58 I prefer to accomplish by means of parts 65 and 66 which are connected to the brake shoes 28 and 29 so that the movement of the brake shoes by the cam device 22 will be transmitted to the members 65 and 66. The member 65 comprises a lever which is connected by means of a pivot or rivet 67 to the leftward or swinging end of the shoe 28. The member 66 comprises a link which is pivotally connected by means of a pin 68 to the leftward or swinging end of the shoe 29. This link 66 carries a pivot in the form of a pin 69 on which the lever 65 may swing. The pivot 69 moves in accordance with the back and forth movement of the shoe 29 and the link 66 connected thereto. The swinging movement of the lever 65 is magnified by reason of the fact that as the pivot 67 moves downwardly, the pivot 69 moves upwardly; consequently, a relatively small movement of the brake shoes 28 and 29 will cause a relatively large angular movement of the lever 65. This angular movement of the lever 65 may be changed by moving the pivots 67 and 69 toward or away from each other.

Figure 3:
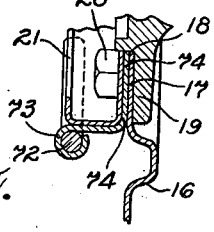
Fig. 3 is a fragmentary section taken as indicated by the line 3—3 of Fig. 1.
Figure 4:
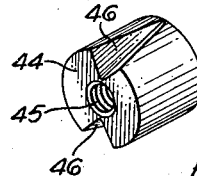
Fig. 4 is a perspective view of the preferred form of cam employed in one practice of my invention.

When the brake shoes 28 and 29 are in retracted position, as shown in full lines in Fig. 1, the lever 65 will be in a position such as that in which it is shown in full lines. As the actuating or cam means 22 is operated to move the brake shoes 28 and 29 outwardly, the lever 65 will be moved to a position such as indicated by dotted lines 65a. The swinging end of the lever 65 is provided with a fork 70 adapted to engage a pin or projection 71 carried by a member 72 adapted to transmit the movement of the lever 65 to the lever member 58 of the ratchet device 55. The movement transmitting means 72 is shown in the form of a ring supported by tubular members 73 so that it may rotate around the axis defined by the spindle 15 upon which the brake structure is mounted. The tubular members 73 are formed by stamping, in conjunction with a ring 74 adapted to be clamped between the parts 17 and 21, as best shown in Fig. 3. The ring 72 has a pin or projection 75 mounted thereon in a position to engage a notch 76 formed in the swinging end of the lever member 58, thereby providing or completing the connection between the lever 65 and the lever 58 whereby the levers 65 and 58 will swing in unison and in accordance with the back and forth movement of the brake shoes 28 and 29 as they are retracted and expanded.

When the brake shoes 28 and 29 are retracted, as shown in full lines, the lever member 58 will be in its full line position. As the brake shoes 28 and 29 are expanded, the lever member 58 will be moved toward its dotted line position 63. After an adjustment of the brake shoes into proper relationship to the brake drum 11, the braking action will be accomplished before the lever member reaches the position indicated by the dotted lines 63, and therefore the pawl 60 will not pass over and engage the succeeding tooth indicated at 80; but as wear occurs, the swinging movement of the lever member 58 will gradually increase until upon the application of the brakes, the lever member 58 will reach the position indicated by the dotted lines 63, at which time the pawl 60 will pass over and engage the succeeding tooth 80. Then, upon release of the brakes, the springs 81 and 82 associated with the shoes 28 and 29 provide the force to retract such shoes, and likewise sufficient force to move the lever member 58 from the dotted line position 63 to the position in which it is shown in full lines, at which time the pawl 60 will rotate the ratchet wheel 56 and the screw 48 through an angle defined by the spacing of the teeth 61 of the ratchet wheel 56. This will result in spreading the rightward, or non-swinging, ends of the shoes 28 and 29, with the result that when the brakes are next applied the movement of the shoes 28 and 29 required for the accomplishment of the desired braking action will not be sufficient to swing the lever member 58 to the dotted line position 63. As will be perceived from the foregoing, the brakes will be automatically kept close to a desired adjustment.

A particular value of my invention I believe to be not only that it may be used in the construction of new brakes, but may be readily applied as an attachment to existing brake structures. Some brakes have a fitting similar to the fitting 39 for supporting a transverse cam. The automatic adjusting attachment for brakes of this type will, of course, not require a new fitting 39, but the cam member 44 may be substituted for the existing cam, together with the members 49, 54, 55, 65, 66, 72, and 74. Where the attachment is to be applied to a brake structure having an entirely different type of adjusting means, the attachment will also include the fitting 39 and the parts 31 which will be connected to the brake shoes in a manner such as shown in the drawing.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a brake adjusting means for use with a brake shoe, the combination of: a part connected to said brake shoe; means for supporting said part so that it may move in a manner to adjust said brake shoe to take up for wear; a cam positioned so as to move transversely of said part, said cam having a sloping face engaging said part so that as said cam is moved transversely the position of said part will be changed; a screw engaging said cam and being operative to move said cam transversely; and a second screw engaging said first named screw operative to change the position of said first named screw.

2. In a brake adjusting means for use with a brake shoe, the combination of: a part connected to said brake shoe; means for supporting said part so that it may move in a manner to adjust said brake shoe to take up for wear; a cam positioned so as to move transversely of said part, said cam having a sloping face engaging said part so that as said cam is moved transversely the position of said part will be changed; a screw making threaded engagement with said cam and being capable of rotation whereby to move said cam transversely; and means for determining the position of said screw, said last named means being adjustable so as to change the position of said screw.

3. In a brake adjusting means for use with a brake shoe, the combination of: a part connected to said brake shoe; means for supporting said part so that it may move in a manner to adjust said brake shoe to take up for wear; a cam positioned so as to move transversely of said part, said cam having a sloping face engaging said part so that as said cam is moved transversely the position of said part will be changed; a screw making threaded engagement with said cam and being capable of rotation whereby to move said cam transversely; means for determining the position of said screw, said last named means being adjustable so as to change the position of said screw; and ratchet means operative to rotate said screw.

4. In a brake adjusting means for use with a brake shoe, the combination of: a part connected to said brake shoe; means for supporting said part so that it may move in a manner to adjust said brake shoe to take up for wear; a cam positioned so as to move transversely of said part, said cam having a sloping face engaging said part so that as said cam is moved transversely the position of said part will be changed; a screw making threaded engagement with said cam and being capable of rotation whereby to move said cam transversely; means for determining the position of said screw, said last named means being adjustable so as to change the position of said screw; ratchet means operative to rotate said screw; and means having connection whereby it will move back and forth in accordance with the movement of said brake shoe, said last named means being connected to said ratchet means and imparting a like movement thereto.

5. In a brake adjusting means for use with a brake shoe, the combination of: a part connected to said brake shoe; means for supporting said part so that it may move in a manner to adjust said brake shoe to take up for wear; a cam positioned so as to move transversely of said part, said cam having a sloping face engaging said part so that as said cam is moved transversely the position of said part will be changed; a screw having operative connection with said cam whereby rotation of said screw will move said cam transversely of said part; ratchet means operative to rotate said screw; and means engaging said brake shoe so that it will be thereby moved back and forth in accordance with the movement of said brake shoe, said last named means being connected to said ratchet means and imparting a like movement thereto.

6. An attachment for the automatic adjustment of a brake structure wherein at least a pair of brake shoes are moved into engagement with a brake drum, and having take-up means associated with said shoes adjustable to compensate for wear, comprising: adjusting means adapted to be connected to said take-up means so as to operate the same; and actuating means connectable to said brake shoes so as to be moved in accordance with the movement of said brake shoes, said actuating means having connection with said adjusting means so as to actuate the same, said actuating means including a lever connected to one of said shoes, a pivot for said lever which is connected to the other of said shoes so as to be moved in accordance with the movement thereof whereby the movement received from said shoes will be magnified, and means connecting said lever to said adjusting means to actuate the same.

7. An automatic adjusting means for use with a brake structure wherein a pair of brake shoes are moved into engagement with a brake drum, and wherein said brake shoes are equipped with parts for engagement with a take-up means, comprising: a cam adapted to engage said parts; a ratchet means connected with said cam so as to control the same, said ratchet having a reciprocable part adapted to be moved back and forth; and actuating means for said ratchet means having direct connection with said brake shoes so as to be moved back and forth in accordance with the movement of said brake shoes, and having connection with said reciprocable part of said ratchet means whereby to reciprocate the same.

8. An automatic adjusting means for use with a brake structure wherein a pair of brake shoes are moved into engagement with a brake drum, and wherein said brake shoes are equipped with parts for engagement with a take-up means, comprising: a cam adapted to engage said parts; a ratchet means connected with said cam so as to control the same, said ratchet having a reciprocable part adapted to be moved back and forth; and actuating means for said ratchet means having direct connection with said brake shoes so as to be moved back and forth in accordance with the movement of said brake shoes, and having connection with said reciprocable part of said ratchet means whereby to reciprocate the same, said actuating means also having parts which operate to magnify the movement received from said shoes so that a relatively small movement of said shoes will accomplish a relatively large movement of said reciprocable part.

9. An automatic adjusting means for use with a brake structure wherein a pair of brake shoes are moved into engagement with a brake drum, and wherein said brake shoes are equipped with parts for engagement with a take-up means, comprising: a cam adapted to engage said parts; a ratchet means connected with said cam so as to move the same; and actuating means for said ratchet means having connection with said brake shoes so as to be moved in accordance with the movement of said brake shoes, and having connection with said ratchet means whereby to actuate the same, said actuating means including a lever connected to one of said brake shoes, a pivot for said lever which is connected to the other of said brake shoes so as to be moved by said other of said brake shoes, and means connecting said lever to said ratchet means to actuate the same.

10. An automatic adjusting means for use with a brake structure wherein a pair of brake shoes are moved into engagement with a brake drum, and wherein said brake shoes are equipped with parts for engagement with a take-up means, comprising: a cam adapted to engage said parts; a ratchet means connected with said cam so as to move the same; and actuating means for said ratchet means having connection with said brake shoes so as to be moved in accordance with the movement of said brake shoes, and having connection with said ratchet means whereby to actuate the same, said actuating means including a lever connected to one of said brake shoes, a pivot for said lever which is connected to the other of said brake shoes so as to be moved by said other of said brake shoes, a ring connecting said lever with said ratchet means, and means for movably supporting said ring so that it will transmit movement from said lever to said ratchet means.

11. An automatic adjusting means for use with a brake structure wherein a pair of brake shoes are moved into engagement with a brake drum, and wherein said brake shoes are equipped with parts for engagement with a take-up means, comprising: a cam mounted so as to move transversely of said parts and having cam faces engaging said parts so as to move the same; a screw having connection with said cam so that the rotation of said screw will move said cam transversely; a ratchet means connected to said screw and being operative to rotate said screw; and actuating means for said ratchet means, said actuating means being connected to said brake shoes so as to be moved back and forth in accordance with the movement of said brake shoes, and having connection with said ratchet means whereby to actuate the same.

12. An automatic adjusting means for use with a brake structure wherein a pair of brake shoes are moved into engagement with a brake drum, and wherein said brake shoes are equipped with parts for engagement with a take-up means, comprising: a cam mounted so as to move transversely of said parts and having cam faces engaging said parts so as to move the same; a screw having connection with said cam so that the rotation of said screw will move said cam transversely; a ratchet means connected to said screw and being operative to rotate said screw; and actuating means for said ratchet means having connection with said brake shoes so as to be moved in accordance with the movement of said brake shoes, and having connection with said ratchet means whereby to actuate the same, said actuating means including a lever connected to one of said brake shoes, a pivot for said lever which is connected to the other of said brake shoes so as to be moved by said other of said brake shoes, and means connecting said lever to said ratchet means to actuate the same.

13. An automatic adjusting means for use with a brake structure wherein a pair of brake shoes are moved into engagement with a brake drum, and wherein said brake shoes are equipped with parts for engagement with a take-up means, comprising: a cam mounted so as to move transversely of said parts and having cam faces engaging said parts so as to move the same; a screw having connection with said cam so that the rotation of said screw will move said cam transversely; a ratchet means connected to said screw and being operative to rotate said screw; and actuating means for said ratchet means having connection with said brake shoes so as to be moved in accordance with the movement of said brake shoes, and having connection with said ratchet means whereby to actuate the same, said actuating means including a lever connected to one of said brake shoes, a pivot for said lever which is connected to the other of said brake shoes so as to be moved by said other of said brake shoes, a ring connecting said lever with said ratchet means, and means for movably supporting said ring so that it will transmit movement from said lever to said ratchet means.

14. In a brake structure, the combination of: a circular brake member; a brake shoe adapted to be applied to said brake member; means for applying said shoe to said brake member to produce a braking action; take-up means for adjustment of said shoe relative to said brake member so as to compensate for wear; a ratchet device for controlling said take-up means, said ratchet device having a part which swings back and forth; an actuating member engaging said brake shoe so as to be thereby moved back and forth as said brake shoe is moved back and forth; and means connecting said actuating member to said part of said ratchet device so that it will be swung back and forth in accordance with the back-and-forth movement of said brake shoe.

15. In a brake structure, the combination of: a brake member; a brake shoe adapted to be applied to said brake member; adjustable take-up means supporting one end of said shoe; brake operating means engaging the other end of said shoe and operating to move the same back and forth relative to said brake member; actuating means engaging said other end of said shoe so as to be thereby moved back and forth as said shoe is moved back and forth; automatic adjustment means for said take-up means having a reciprocable member which may be moved back and forth and operating to adjust said take-up means when said reciprocable member is moved beyond a prescribed limit; and means connecting said reciprocable member with said actuating means so that it will be moved back and forth in accordance with the back-and-forth movement of said brake shoe.

16. In a brake structure, the combination of: a brake member; a brake shoe adapted to be applied to said brake member; adjustable take-up means supporting one end of said shoe; brake operating means engaging the other end of said shoe and operating to move the same back and forth relative to said brake member; automatic adjustment means for said take-up means having a reciprocable member which may be moved back and forth and operating to adjust said take-up means when said reciprocable member is moved beyond a prescribed limit; and actuating means for said automatic adjustment means comprising a part engaging said brake shoe so as to be thereby moved back and forth as said shoe is moved back and forth, and movement magnifying means connecting said part to said reciprocable member of said automatic adjustment means.

17. In a brake structure, the combination of: a circular brake member; a pair of brake shoes adapted to be applied to said brake member; means for applying said shoes to said brake member to produce a braking action; take-up means for adjustment of said shoes relative to said brake member so as to compensate for wear; automatic means operated in conjunction with said brake shoe and said applying means to adjust said take-up means as the wear thereof exceeds a prescribed amount; and control means for said automatic adjusting means comprising a lever having one end pivotally connected to one of said brake shoes, a pivot intermediate the ends of said lever, means for connecting said pivot to the other of said brake shoes so that it will be moved thereby, and means connecting the other end of said lever to said automatic adjusting means.

ARCHIE W. HAMMOND.